(12) United States Patent
Zhou (10) Patent No.: US 10,473,813 B2
(45) Date of Patent: Nov. 12, 2019

(54) SYSTEMS AND METHODS TO DETERMINE RELATIVE ELEMENTAL CONCENTRATIONS FROM NUCLEAR SPECTROSCOPY MEASUREMENTS

(71) Applicant: Schlumberger Technology Corporation, Sugar Land, TX (US)

(72) Inventor: Tong Zhou, Sugar Land, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 0 days.

(21) Appl. No.: 15/794,396

(22) Filed: Oct. 26, 2017

(65) Prior Publication Data

US 2019/0129061 A1    May 2, 2019

(51) Int. Cl.
*G01V 5/04* (2006.01)
*G01V 5/10* (2006.01)

(52) U.S. Cl.
CPC ............ *G01V 5/045* (2013.01); *G01V 5/101* (2013.01)

(58) Field of Classification Search
CPC .......... G01V 5/101; G01V 5/102; G01V 5/10; G01V 5/045; G01V 5/12; G01V 5/108
See application file for complete search history.

(56) References Cited

U.S. PATENT DOCUMENTS

| | | | |
|---|---|---|---|
| 4,788,424 A | 11/1988 | Preeg | |
| 4,937,446 A | 6/1990 | McKeon et al. | |
| 5,045,693 A | 9/1991 | McKeon et al. | |
| 5,408,097 A | 4/1995 | Wraight et al. | |
| 5,471,057 A | 11/1995 | Herron | |
| 2008/0023629 A1 | 1/2008 | Herron et al. | |
| 2012/0091328 A1* | 4/2012 | Suparman | G01V 5/101 |
| | | | 250/269.1 |
| 2014/0042311 A1 | 2/2014 | Zhou et al. | |
| 2014/0343857 A1 | 11/2014 | Pfutzner et al. | |

(Continued)

OTHER PUBLICATIONS

J. A. Grau, J. S. Schweitzer, "Elemental Concentrations from Thermal Neutron Capture Gamma-ray Spectra in Geological Formations", Nucl. Geophys. vol. 3, No. 1, pp. 1-9, 1989, Int. J. Radiat. Appl. Instrum. Part E.

(Continued)

*Primary Examiner* — David P Porta
*Assistant Examiner* — Fani Boosalis
(74) *Attorney, Agent, or Firm* — Trevor G. Grove (57) ABSTRACT

A system may include a pulsed neutron generator designed to emit neutrons into a borehole of a geological formation using a pulsing scheme. The system may also include a gamma-ray detector designed to take measurements of capture gamma-rays during a time period during the pulsing scheme. The system may also include data processing circuitry designed to calculate one or more sigma values based at least in part on the measurements of the capture gamma-rays taken during the time period during the pulsing scheme. The data processing circuitry may also calculate a factor of yields to weights value based at least in part on the one or more sigma values and convert a plurality of relative yields of corresponding elements in the geological formation to a plurality of elemental relative weights based at least in part on the factor of yields to weights.

20 Claims, 8 Drawing Sheets

(56) References Cited

U.S. PATENT DOCUMENTS

2016/0077234 A1  3/2016  Zhou et al.
2016/0195636 A1  7/2016  Grau et al.

OTHER PUBLICATIONS

J. A. Grau, J. S. Schweitzer, D. V. Ellis, R. C. Hertzog, "A Geological Model for Gamma-ray Spectroscopy Logging Measurements", Nucl. Geophys. vol. 3, No. 4, pp. 351-9, 1989.

* cited by examiner

SYSTEMS AND METHODS TO DETERMINE RELATIVE ELEMENTAL CONCENTRATIONS FROM NUCLEAR SPECTROSCOPY MEASUREMENTS

BACKGROUND

This disclosure relates to using neutron-induced gamma-ray spectroscopy to determine the relative concentrations and/or weights of various elements within a geological formation.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Producing hydrocarbons from a borehole drilled into a geological formation is a remarkably complex endeavor. In many cases, decisions involved in hydrocarbon exploration and production may be informed by measurements from downhole well-logging tools that are conveyed deep into the borehole. The measurements may be used to infer properties and characteristics of the geological formation surrounding the borehole. The discovery and observation of resources using downhole techniques generally takes place down in the borehole with sensors. These sensors may be a part of a tool-string that may be attached to a drill or other downhole device.

One particular type of measurement involves neutron-induced gamma-ray spectroscopy. The measurement may be used to estimate the abundance of oil or other resources of interest in the area. In general, high-energy neutrons may be emitted into the environment (e.g., the borehole and/or the geological formation). The high-energy neutrons may collide with, be captured by, and/or scatter off the nuclei of elements in the environment. These interactions may cause the elements to emit gamma-rays having energies that vary depending on the type of element that emitted the gamma ray. By analyzing the energy spectrum of gamma-rays, relative yields of the different elements found in and around the borehole may be determined. The relative yields of the elements may be proportionally related to relative weights by a Factor of Yields to Weights (FY2W). The relative weights may then be used to determine properties of the geological formation. During processing of capture gamma-rays, a method known as "oxide closure" may be used to determine a value of FY2W due to gamma-rays generated by a process of neutron capture. Namely, by ignoring gamma-rays caused by elements that are generally found in porous space (e.g., hydrogen, chlorine, etc.), and assuming that major rock elements are in the form of oxide, the sum of the weight of the rock elements with their associated oxygen may be assumed to be equal to 1. In many cases, the method of oxide closure provides reasonably accurate results.

In some cases, however, the method of oxide closure may be subject to inaccuracies due to the elements in the borehole itself. For example, a cased borehole may include a metal casing with cement in the annulus between the casing and the wall of the wellbore. This introduces multiple rock elements (e.g., silicon, calcium, iron, etc.) into the borehole. These elements in the borehole may produce gamma-rays that appear in the spectrum, and thus removing from the spectrum the contributions of these elements may involve very complex adjustments. Additionally, because the method of oxide closure ignores elements such as hydrogen and chlorine, the relative weights of the elements of porous space may be calculated separately and, thus, may lead to inaccuracy. Additionally, oxide closure may be used in a secondary process to calculate a value of FY2W due to gamma-rays generated by a process of inelastic scattering. However, as this process may also be based on oxide closure, the inelastic FY2W may include statistical noise and/or inaccuracies similar to that of the capture FY2W from oxide closure.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

To better enhance the measurement of particular elements (e.g., carbon) in a geological formation based on neutron-induced gamma-ray spectroscopy, a factor of yields to weights value may be calculated to convert relative yields of corresponding elements to relative weights.

Indeed, in one example, a system may include a pulsed neutron generator designed to emit neutrons into a borehole of a geological formation using a pulsing scheme. The system may also include a gamma-ray detector designed to take measurements of capture gamma-rays during a time period during the pulsing scheme. The system may also include data processing circuitry designed to calculate one or more sigma values based at least in part on the measurements of the capture gamma-rays taken during the time period during the pulsing scheme. The data processing circuitry may also calculate a factor of yields to weights value based at least in part on the one or more sigma values and convert multiple relative yields of corresponding elements in the geological formation to elemental relative weights based at least in part on the factor of yields to weights.

In another embodiment, a method for determining a factor of yields to weights value in a cased borehole of a geological formation may include emitting neutrons, from a neutron generator, placed into a borehole in a geological formation, to cause capture and inelastic scattering events that generate photons. The method may also include detecting the photons using one or more detectors and determining, from the detected photons, at least a ratio of photon counts between two detectors or an apparent sigma. The method may also include determining the factor of yields to weights value based at least in part on the ratio of photon counts between two detectors or the apparent sigma. Additionally, the method may include converting multiple relative yields of elements in the geological formation to elemental concentrations using the factor of yields to weights value. The method may also include determining, a property of the geological formation using at least one of the elemental concentrations.

In another embodiment, method may include emitting neutrons, out of a downhole tool placed into a borehole in a geological formation, to cause inelastic scattering events that generate photons. The method may also include detecting the photons using multiple detectors and determining, via a processor, a count rate ratio of the photons between at least two of the detectors. The method may also include determining a factor of yields to weights value based at least in part on the count rate ratio and converting multiple relative yields of corresponding elements in the geological formation to elemental relative weights using the factor of yields to weights value. Additionally, the method may include determining a property of the geological formation using at least one of the elemental relative weights.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are examples of the presently disclosed techniques. Additionally, in an effort to provide a concise description of these embodiments, the features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The oil and gas industry includes a number of sub-industries, such as exploration, drilling, logging, extraction, transportation, refinement, retail, and so forth. During exploration and drilling, boreholes may be drilled into the ground for reasons that may include discovery, observation, or extraction of resources. These resources may include oil, gas, water, or any other combination of elements within the ground.

Boreholes, sometimes called wellbores, may be straight or curved holes drilled into the ground from which resources may be discovered, observed, or extracted. During and/or after the establishment of a borehole, well logging may be practiced. Well logging may include making a detailed record of the geological formations penetrated by a borehole, and is generally part of the discovery and observation of resources.

The exploration of what lies beneath the ground may be accomplished by a number of methods including surface and downhole techniques. The discovery and observation of resources using downhole techniques generally takes place down in the borehole with sensors. These sensors may be a part of a tool-string that may be attached to a drill or other downhole device.

One particular type of measurement involves neutron-induced gamma-ray spectroscopy. The measurement may be used to estimate the abundance of oil or other resources of interest in the area. In general, high-energy neutrons may be emitted into the environment (e.g., the borehole and/or the geological formation). The high-energy neutrons may collide with, be captured by, and/or scatter off the nuclei of elements in the environment. These interactions may cause the elements to emit gamma-rays having energies that vary depending on the type of element that emitted the gamma ray. By analyzing the energy spectrum of gamma-rays, relative yields of the different elements found in and around the borehole may be determined. The relative yields of the elements may be proportionally related to relative weights by a Factor of Yields to Weights (FY2W). The relative weights may then be used to determine properties of the geological formation. These relative weights of the geological formation may also be converted to dry weights or dry weight percentages for use in certain embodiments.

In general, hydrocarbons make up the majority of compounds of interest in downhole operations, being the base compounds of oil and gas. Therefore, carbon is an element of substantial interest that may signify the presence and/or magnitude of oil and gas reservoirs. A calculated FY2W value may be used to convert the relative yields of multiple elements to their associated relative weights. The prolificacy of carbon (i.e., oil or gas) in a reservoir is but one property of many that can be accurately determined while using this method.

When collecting gamma-ray spectra, relative yields may be calculated from gamma-rays induced from neutron capture events—also known as thermal neutron capture events—and/or inelastic scattering events. In this disclosure, gamma-rays generated from neutron capture events may be referred to as "capture gamma-rays" and gamma-rays generated from inelastic scattering events may be referred to as "inelastic gamma-rays." As such, there may also be different relative yields (capture relative yields and inelastic relative yields) and a corresponding FY2W (capture FY2W and inelastic FY2W) for each type of gamma-ray interaction.

As stated above, some boreholes, such as cased boreholes, may include silicon, calcium, magnesium, etc. due to the presence of pipe, cement, and/or other materials. Additionally, elements that may be found in porous space (e.g., hydrogen, chlorine, etc.) may also be found in certain boreholes. To account for these borehole effects, which could complicate efforts to determine FY2W using a method such as oxide closure, the FY2W value(s) may be calculated at least in part by correlation with an effective sigma of the environment and/or a count rate ratio between multiple detectors.

Figure 1:
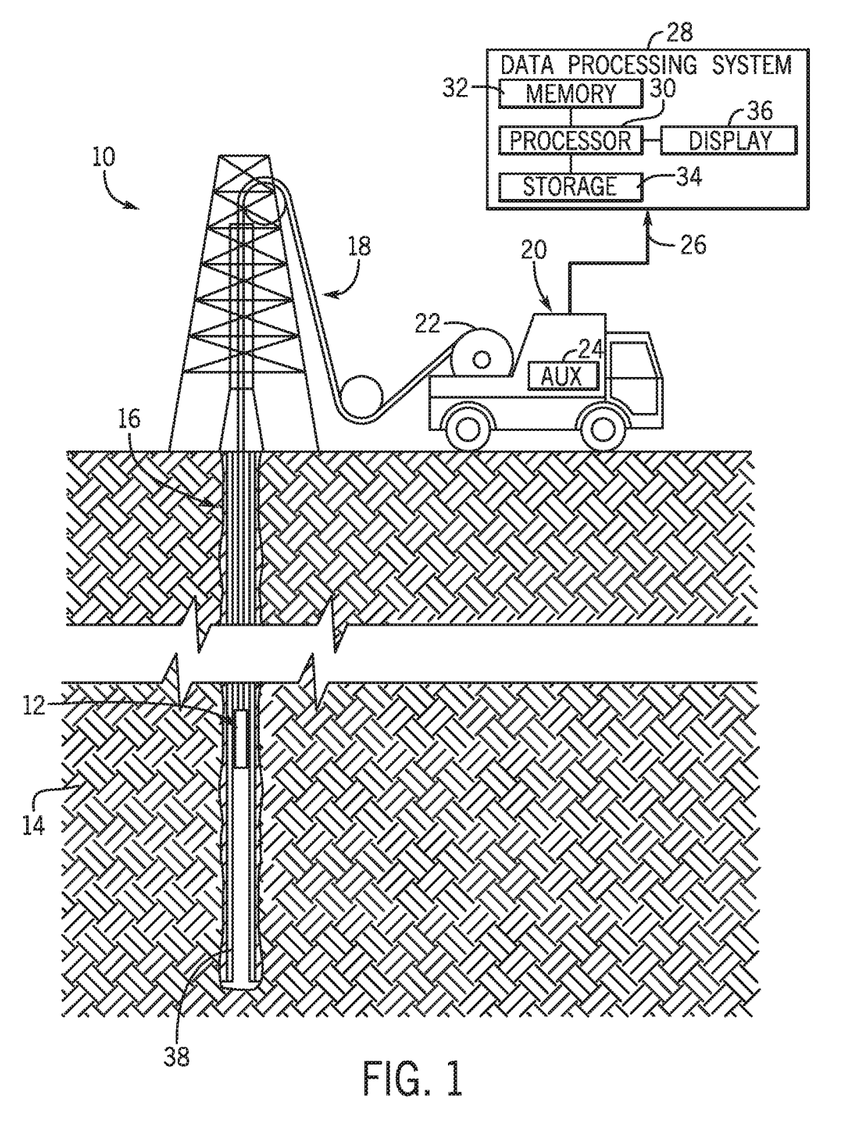
FIG. 1 is an example of a neutron-induced gamma-ray spectroscopy system, in accordance with an embodiment.

With the foregoing in mind, FIG. 1 illustrates a well-logging system 10 that may employ the systems and methods of this disclosure. The well-logging system 10 may be used to convey a downhole tool 12 through a geological formation 14 via a borehole 16. In the example of FIG. 1, the downhole tool 12 is conveyed on a cable 18 via a logging winch system (e.g., vehicle) 20. Although the logging winch system 20 is schematically shown in FIG. 1 as a mobile logging winch system carried by a truck, the logging winch system 20 may be substantially fixed (e.g., a long-term installation that is substantially permanent or modular). Any suitable cable 18 for well logging may be used. The cable 18 may be spooled and unspooled on a drum 22 and an auxiliary power source 24 may provide energy to the logging winch system 20 and/or the downhole tool 12.

Moreover, while the downhole tool 12 is described as a wireline downhole tool, it should be appreciated that any suitable conveyance may be used. For example, the downhole tool 12 may instead be conveyed as a logging-while-drilling (LWD) tool as part of a bottom-hole assembly (BHA) of a drill string, conveyed on a slickline or via coiled tubing, and so forth. For the purposes of this disclosure, the downhole tool 12 may be any suitable downhole tool that uses neutron-induced inelastic gamma-ray spectroscopy within the borehole 16 (e.g., downhole environment).

The downhole tool 12 may receive energy from an electrical energy device or an electrical energy storage device, such as the auxiliary power source 24 or another electrical energy source to power the tool. Additionally, in some embodiments the downhole tool 12 may include a power source within the downhole tool 12, such as a battery system or a capacitor to store sufficient electrical energy to activate the neutron emitter and record gamma-ray radiation.

Control signals 26 may be transmitted from a data processing system 28 to the downhole tool 12, and data signals 26 related to the spectroscopy results may be returned to the data processing system 28 from the downhole tool 12. The data processing system 28 may be any electronic data processing system that can be used to carry out the systems and methods of this disclosure. For example, the data processing system 28 may include a processor 30, which may execute instructions stored in memory 32 and/or storage 34. As such, the memory 32 and/or the storage 34 of the data processing system 28 may be any suitable article of manufacture that can store the instructions. The memory 32 and/or the storage 34 may be read-only memory (ROM), random-access memory (RAM), flash memory, an optical storage medium, or a hard disk drive, to name a few examples. A display 36, which may be any suitable electronic display, may display images generated by the processor 30. The data processing system 28 may be a local component of the logging winch system 20 (e.g., within the downhole tool 12), a remote device that analyzes data from other logging winch systems 20, a device located proximate to the drilling operation, or any combination thereof. In some embodiments, the data processing system 28 may be a mobile computing device (e.g., tablet, smart phone, or laptop) or a server remote from the logging winch system 20.

Figure 2:
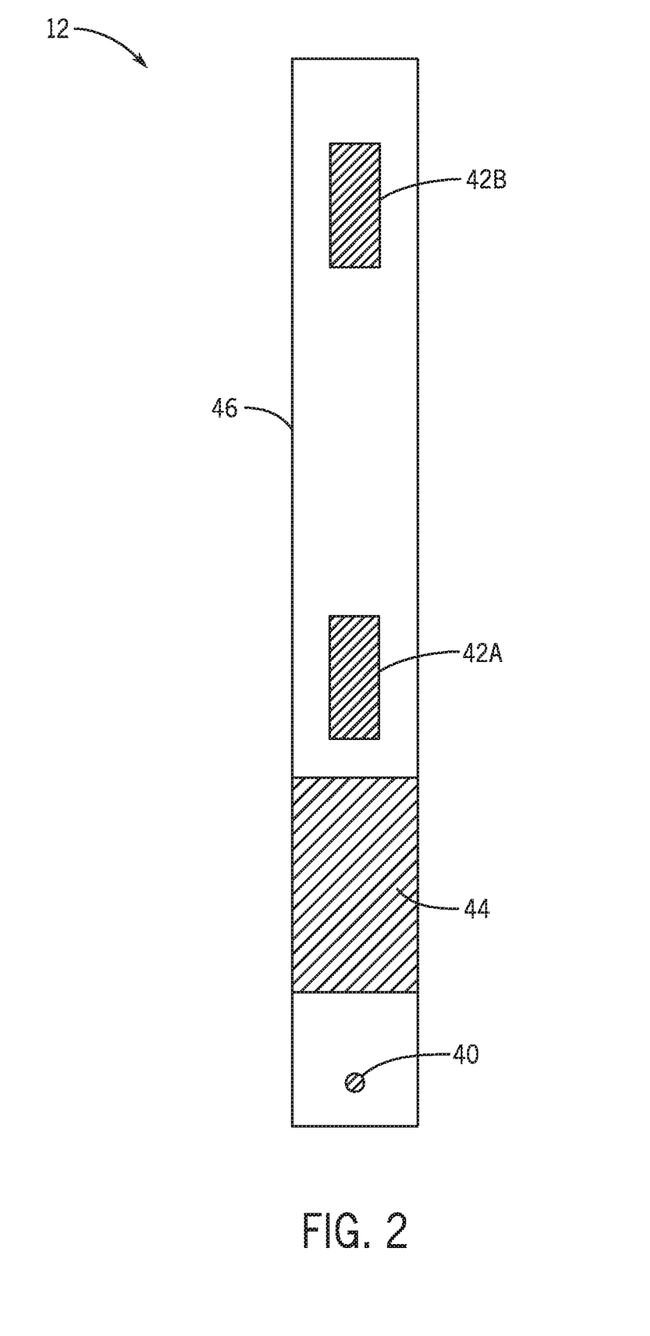
FIG. 2 is an example of a neutron-induced gamma-ray spectroscopy downhole tool, in accordance with an embodiment.

The downhole tool 12 may be used in a borehole 16 with or without a casing 38. As stated above, a borehole casing 38 may include pipe, cement, or other materials. As depicted in FIG. 2, the downhole tool 12 may include a neutron source 40 and one or more gamma-ray detectors 42. Additionally, the neutron source 40 and gamma-ray detectors 42 may be separated by a neutron/gamma-ray shield 44. The shield 44 may prevent neutrons from directly affecting the gamma-ray detectors 42 and/or minimize oversaturation. In one embodiment, the neutron source 40, gamma-ray detectors 42, and shield 44 are enclosed in a housing 46; however, the components may also be employed in separate housings. The neutron source 40 may be any suitable type of neutron generator (e.g., pulsed neutron generator (PNG)) that produces neutrons of sufficiently high energy to produce gamma-rays via inelastic scattering and/or neutron capture events. When placed into the borehole 16 and activated, the neutron source 40 may emit high-energy neutrons into the surrounding formation 14 in multiple directions. These high-energy neutrons interact with nuclei in the surrounding area in events including, but not limited to, inelastic scattering and neutron capture.

Inelastic scattering events generally take place during the on time of the neutron emission from the neutron source 40, and may disappear quickly (e.g., within 2 microseconds (µs)) after the neutron emission has stopped. During an inelastic scattering collision, the neutron hits a nucleus causing the emission of a photon (e.g., gamma-ray) of a specific energy level. This mono-energetic level (e.g., about 4.43 MeV for carbon) allows for the distinction of elements in the environment from each other and other background radiation in the spectrum of energies. Each gamma-ray that is detected by the gamma-ray detector 42 is counted in a bin with the associated energy level. The count rates of different energies may then be viewed as a spectrum of energies with associated counts for each energy level.

Unlike inelastic gamma-rays which present primarily during the emission from the neutron source 40, capture gamma-rays may be detected both during and after neutron emission, and may decay exponentially after the neutron emission has stopped. The instantaneity of the inelastic gamma-rays and the decay of capture gamma-rays can be seen in plot 50 of FIG. 3 where the x-axis 52 depicts time in µs and the y-axis 54 depicts a normalized count rate of both types of detected gamma-rays on a logarithmic scale. The difference between capture and inelastic gamma-rays can be seen from the result of a PNG pulsing scheme 56. The pulsing scheme 56 may include multiple "on" periods 58 and "off" periods 60 of the neutron source 40 and an extended off period 60, which result in the gamma-ray detections of plot 50. For example, the on periods 58 may be 20 µs, the off periods may be 30 µs, and an extended off period 60 may extend, for example, up to 1 millisecond. However, multiple different pulsing schemes 56 of on periods 58 and off periods 60 may also be used.

Figure 3:
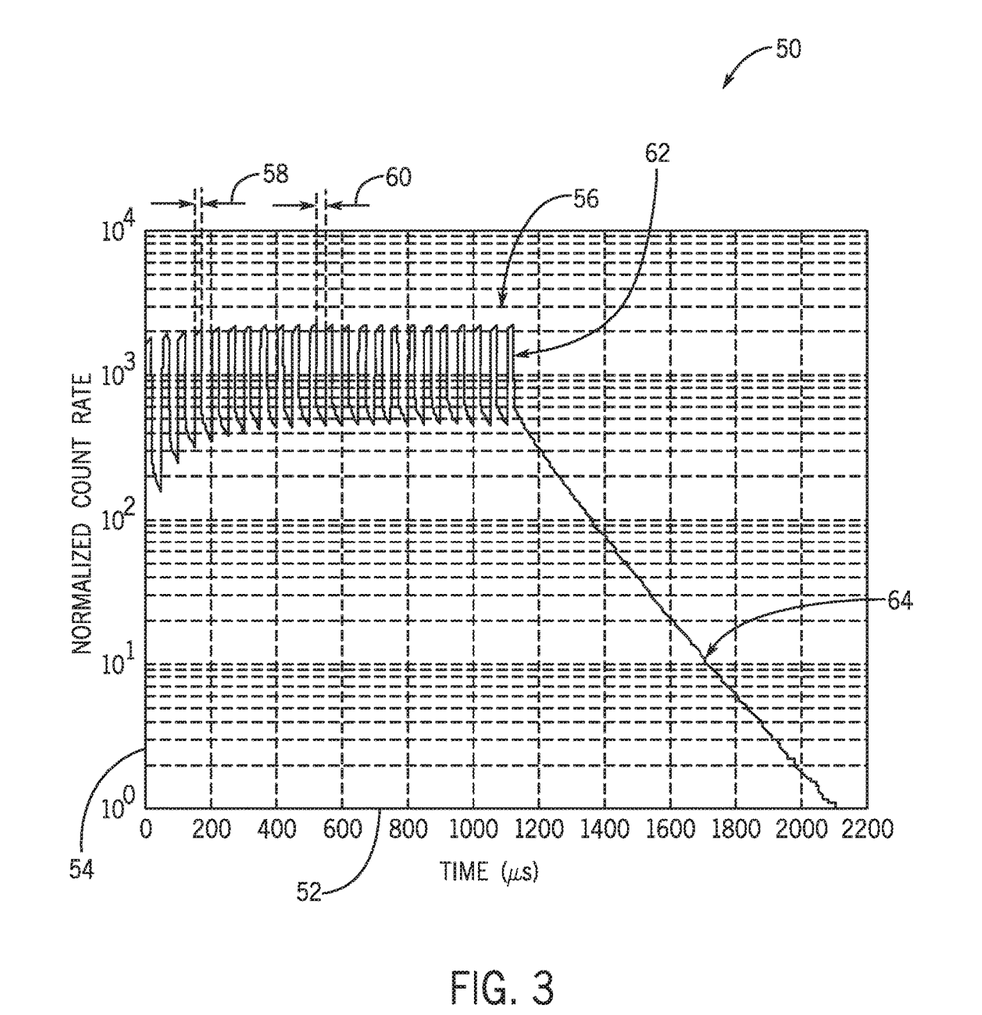
FIG. 3 is a plot of a neutron-induced gamma-ray measurement over time, in accordance with an embodiment.

In the illustrated embodiment shown in plot 50, when an on period 58 begins, the count rate may instantly jump due to the increase in inelastic gamma-ray detection. Similarly, when the off period 60 begins, the count rate may immediately drop. Conversely, during the span of an on period 58, the count rate may continuously increase due to the increase in capture gamma-rays. Likewise, during an off period 60, the count rate may decrease exponentially due to capture gamma-ray decay emissions. Throughout the pulsing scheme 56, measurements pertaining to the energy levels of the gamma-rays may also be taken to determine elemental relative yields of the environment. In some embodiments, the pulsing scheme 56 may be repeated multiple times to gather more data.

After the final pulse 62 of the pulsing scheme 56, the extended off period 60 may begin. An exponential decay 64 relates to the decay of the isotopes in the environment and the detection of corresponding capture gamma-rays. The decay constant of the decay 64 may be correlated (i.e., inversely proportional) to a sigma value representative of properties of the borehole 16 and geological formation 14 (e.g., sigma). However, due to the elements within and the geometries and properties of the borehole 16 and the geological formation 14, the borehole 16 and formation 14 may have different sigma values (borehole sigma and formation sigma). To account for both, an apparent sigma may be calculated to balance the effects from each location. Additionally, borehole sigma and formation sigma may be correlated to the decay 64 more or less at different times during the decay 64. For example, earlier times during the decay 64 may have more borehole effect on the apparent sigma than later times. As such, the use of timing gates when taking measurements and determining the apparent sigma may be done judiciously to achieve a balance of the borehole sigma and formation sigma.

Using an apparent sigma measured at an appropriate time to account for both borehole and formation effects, the capture FY2W value may be calculated. For example, the FY2W value may be linearly correlated to the apparent sigma. Calculating FY2W via the apparent sigma may avoid ignoring elements that may be found in porous space (e.g., hydrogen, chlorine, etc.). Additionally, this method may take into account borehole effects due to a casing 38, and, therefore, may avoid arduous calculations for compensation. As stated above, the apparent sigma may be calculated for a particular time during the decay 64.

Figure 4:
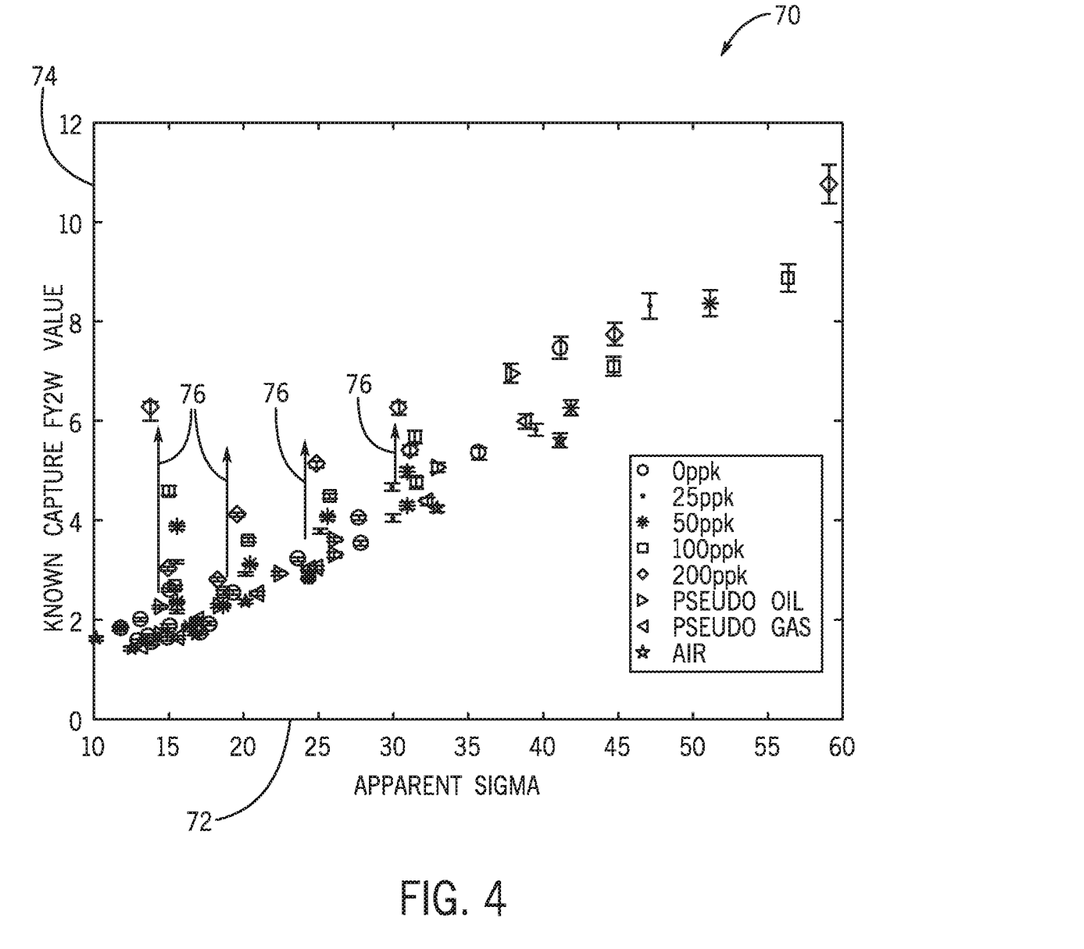
FIG. 4 is a plot of known Factor of Yields to Weights (FY2W) values for capture spectroscopy and calculated apparent sigma using a first timing gate, in accordance with an embodiment.
Figure 5:
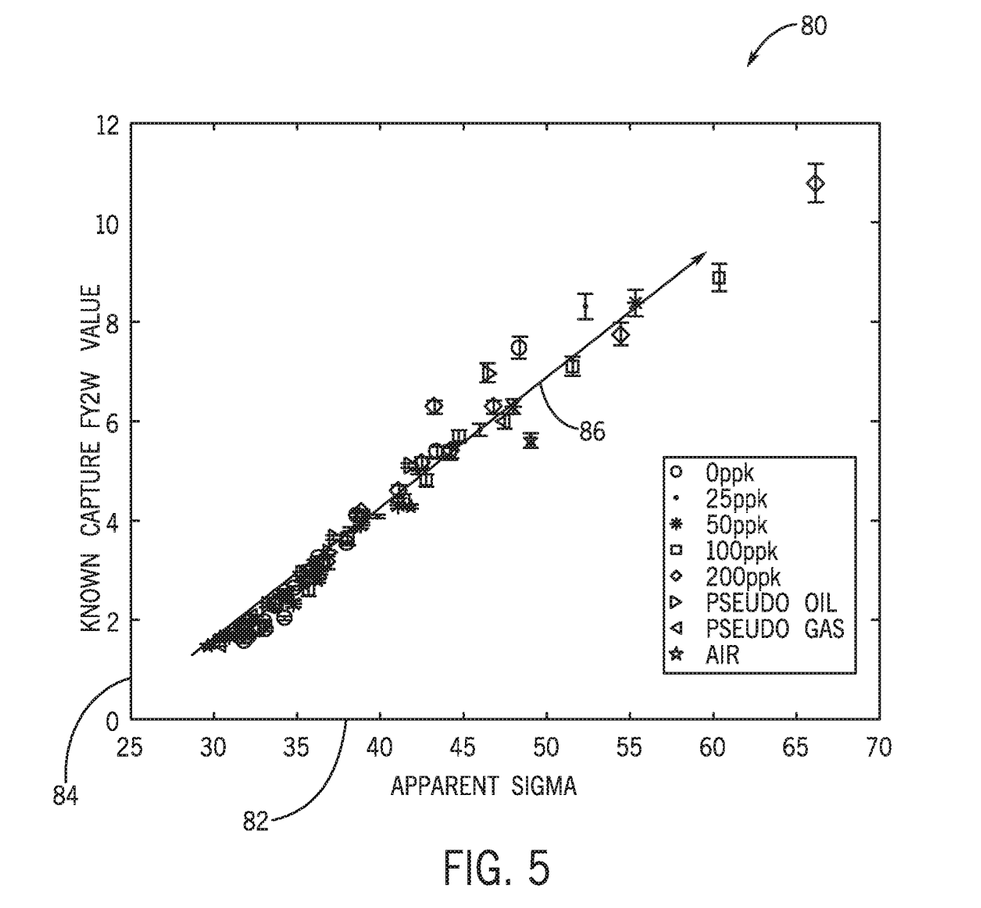
FIG. 5 is a plot of known FY2W values for capture spectroscopy and calculated apparent sigma using a second timing gate, in accordance with an embodiment.

To illustrate this, FIG. 4 depicts a plot 70 where the x-axis 72 depicts the calculated apparent sigma and the y-axis 74 depicts known capture FY2W values from laboratory experimentation. Similarly, FIG. 5 depicts a plot 80 where the x-axis 82 depicts the calculated apparent sigma and the y-axis 84 depicts known capture FY2W values from laboratory experimentation. The apparent sigmas of plot 70 were taken using relatively late timing gates. Although, at first glance, there appears to be a linear trend to the plot 70, the correlation between the apparent sigmas and capture FY2W values may be burdened by spines 76. These spines 76 appear from experiments using different borehole fluids (e.g., air, pseudo gas, pseudo oil, and multiple saline concentrations). These spines 76 may occur due a minimized borehole effect because the time period for which the apparent sigma was calculated was relatively late in the decay 64. However, plot 80 shows an improved linear correlation 86 between apparent sigma and capture FY2W. The apparent sigmas of plot 80 were calculated based off of the decay 64 during a time period that balances borehole and formation effects. For example, the time period may be between 10 μs and 480 μs after the final pulse 62. Shorter, longer, and/or shifted time periods may also be used. For example, in one embodiment, the time period may be between on periods 58 of a pulsing scheme 56. Using a balanced time period allows for a correlation (e.g., linear) between apparent sigma and capture FY2W.

Instead of using a single apparent sigma, multiple sigma values may be calculated using different time periods. These multiple sigma values may then be used together to balance the borehole effects and formation effects on sigma. For example, the multiple sigma values may be employed in a system of linear equations. Non-linear correlations/equations may also be used to correlate the capture FY2W value and the apparent sigma or multiple sigma values.

Figure 6:
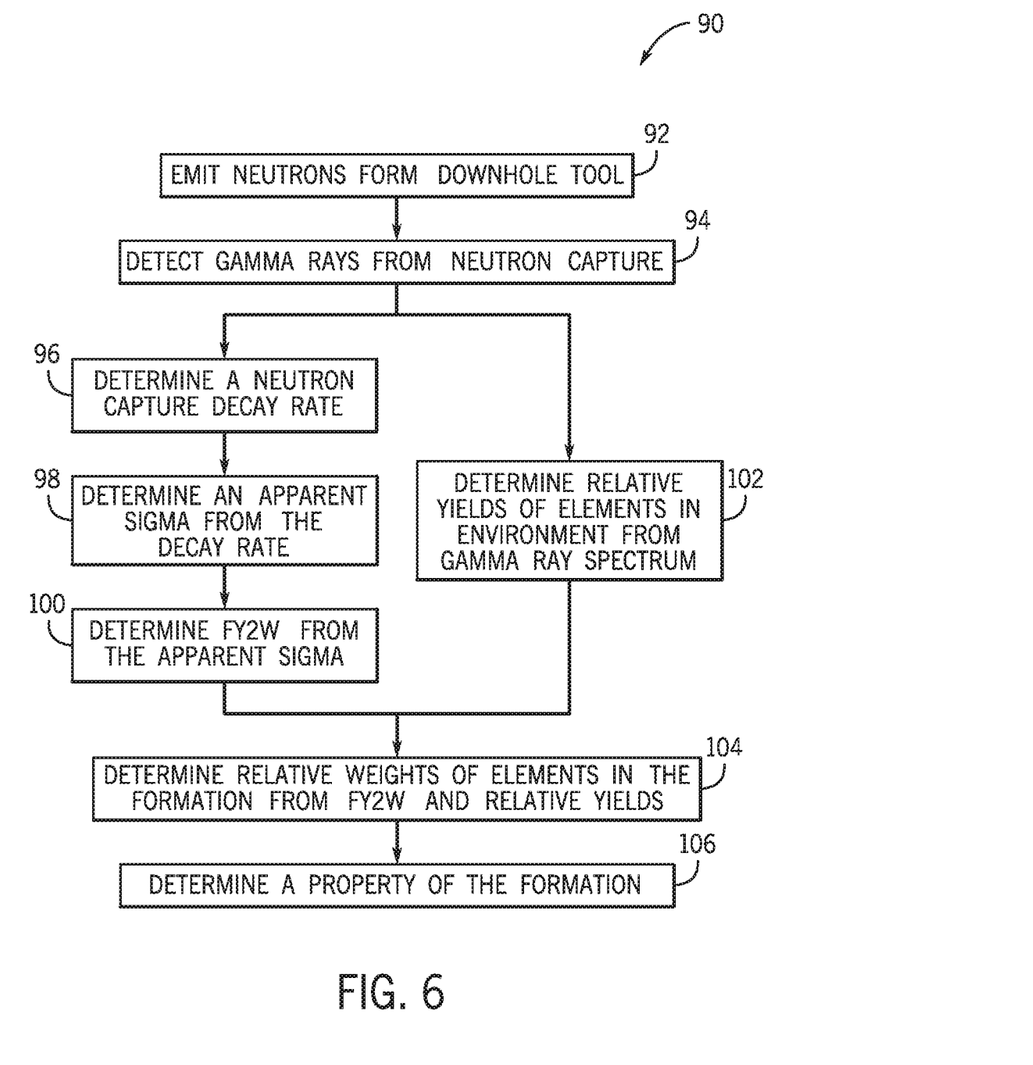
FIG. 6 is a flowchart illustrating a method for calculating a capture FY2W value and a property of a formation therefrom, in accordance with an embodiment.

FIG. 6 illustrates a flowchart 90 of a process to determine a capture FY2W value and a property of the geological formation 14 therefrom. Neutrons are emitted from a downhole tool 12 using a neutron source 40 (process block 92). Gamma-rays may be detected at one or more gamma-ray detectors 42 (process block 94). A data processing system 28 may take the count rates and energy levels of the detected gamma-rays and determine a capture gamma-ray decay rate (process block 96). For example, the data processing system 28 may use timing gates to isolate a time period of the decay 64 to determine the decay rate. From the decay rate, the data processing system 28 may calculate an apparent sigma value (process block 98). As explained previously, the apparent sigma value may include one or more sigma values that together balance borehole and formation effects. Additionally, the data processing system 28 may determine the capture FY2W value from the apparent sigma value (process block 100). The data processing system 28 may also use the detected gamma-rays to determine the relative yields of the elements in the environment (process block 102). Using the relative yields and the determined capture FY2W value, the data processing system 28 may determine the relative weights of the elements in the geological formation (process block 104) and determine a property of the geological formation therefrom (process block 106). Although the flowchart 90 is shown in a given order, in certain embodiments, portions of the flowchart may be reordered, deleted, occur simultaneously, and/or be initiated and/or controlled by multiple data processing systems 28.

As stated above, the capture FY2W value may be used with relative yield data obtained from capture gamma-rays. In some embodiments, an inelastic FY2W value may also be calculated to provide enhanced accuracy in determining the elemental relative weights when using data obtained from inelastic gamma-rays. However, because inelastic scattering events occur so quickly after neutron emission from the neutron source 40, the inelastic FY2W value may not easily correlate with an apparent sigma value. However, from laboratory experiments, it has been found that the inelastic FY2W value may in fact correlate to a count rate ratio between two or more gamma-ray detectors 42.

In a manner similar to taking measurements to determine the apparent sigma, to determine a count rate ratio, the gamma-ray counts may be sampled at a time period defined by timing gates. As stated previously, inelastic scattering events and measurements generally occur while the neutron source 40 is in an on period 58 of the pulsing scheme 56. Therefore, the timing gates may be set to sample the inelastic gamma-ray counts during an on period 58. Because these gamma-ray counts are taken during the on period 58, they are sometimes referred to as burst count rates. These burst count rates may be taken over one or more on periods 58 during one or more pulsing schemes 56.

Returning to consider FIG. 2, the downhole tool 12 may include multiple gamma-ray detectors 42. In one embodiment, a first gamma-ray detector 42A may be closer to the neutron source 40 than a second gamma-ray detector 42B. Because of the different relative positions of the two detectors and the geometry/properties of the environment, the burst count rates measured by each of the two gamma-ray detectors 42A and 42B may also be different. The ratio of these two measurements may then yield a count rate ratio. The count rate ratio may be used to account for certain borehole effects.

Figure 7:
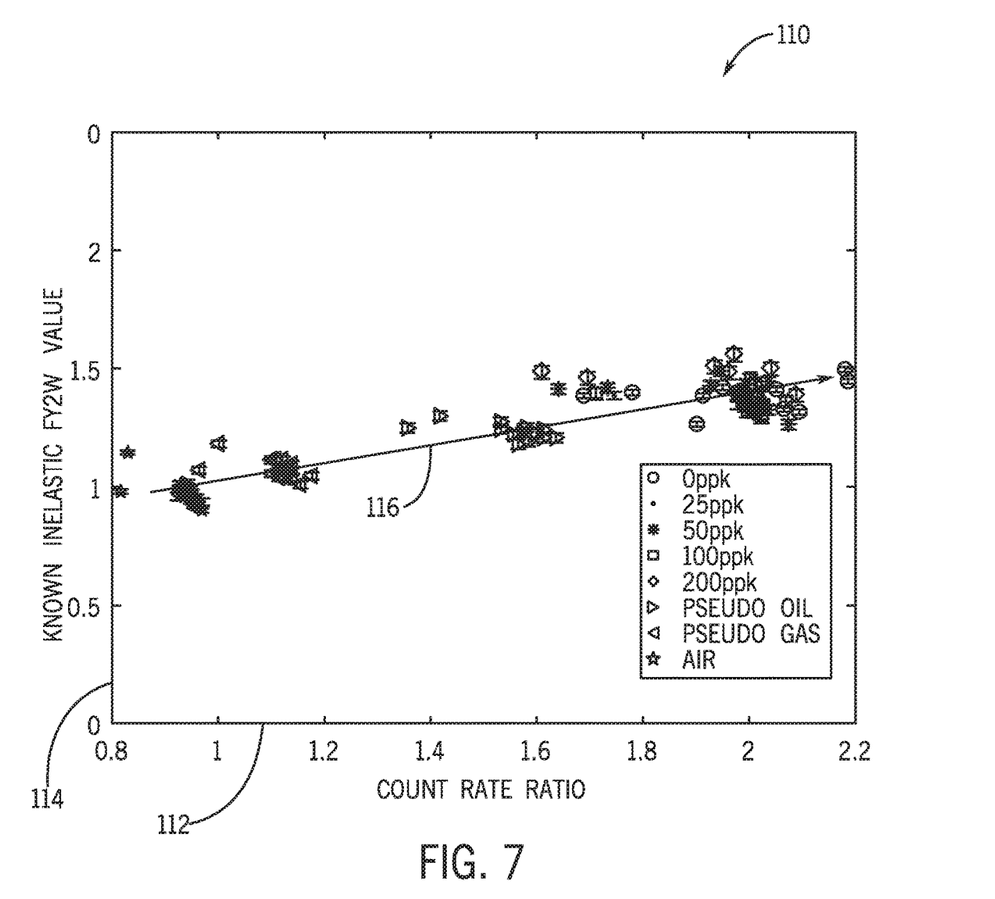
FIG. 7 is a plot of known FY2W values for inelastic spectroscopy and count rate ratios between two detectors, in accordance with an embodiment.

FIG. 7 illustrates a plot 110 where the x-axis 112 displays count rate ratio and the y-axis 114 displays known inelastic FY2W value. As shown in the plot 110, the count rate ratio has a linear correlation 116 to the inelastic FY2W value. As will be appreciated, the use of non-linear correlations and/or additional parameters may also be used when determining the inelastic FY2W value. For example, borehole characteristics (e.g., hole size, casing size, casing weight, etc.) and/or the inelastic relative yields of certain elements (e.g., iron, silicon, calcium etc.) may be factored into the determination of the inelastic FY2W value. As will also be appreciated, multiple count rate ratios from one or more sets of two or more gamma-ray detectors 42 may also be employed to further the determination of the inelastic FY2W value.

Figure 8:
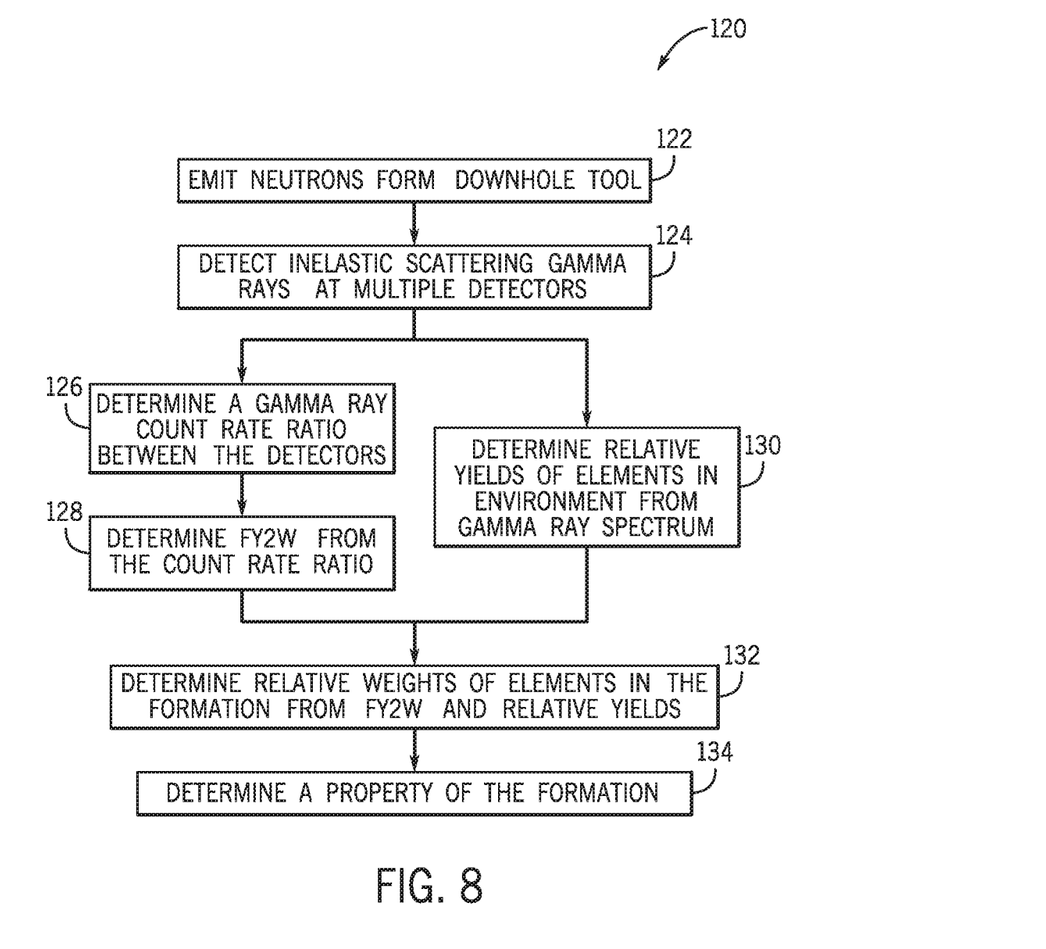
FIG. 8 is a flowchart illustrating a method for calculating an inelastic FY2W and a property of a formation therefrom, in accordance with an embodiment.

FIG. 8 illustrates a flowchart 120 of a process to determine the inelastic FY2W value and a property of the geological formation therefrom. Neutrons are emitted from a downhole tool 12 using a neutron source 40 (process block 122). Gamma-rays may be detected at two or more gamma-ray detectors 42 (process block 124). A data processing system 28 may take the count rates of the detected gamma-rays from each of the gamma-ray detectors 42 and determine a count rate ratio (process block 126). In turn, the count rate ratio may be used by the data processing system 28 to determine the inelastic FY2W value (process block 128). The data processing system 28 may also use the gamma-ray detections to determine the relative yields of the elements in the environment (process block 130). Using the relative yields and the determined inelastic FY2W value, the data processing system 28 may determine the relative weights of the elements in the geological formation (process block 132) and determine a property of the geological formation therefrom (process block 134). Although the flowchart 120 is shown in a given order, in certain embodiments, portions of the flowchart may be reordered, deleted, occur simultaneously, and/or be initiated/controlled by multiple data processing systems 28.

Accordingly, technical effects of the present disclosure allow for the determination of a FY2W value using an apparent sigma, from the capture gamma-ray decay, and/or the ratio of counts between multiple detectors. This determination may allow for further increased accuracy and precision of elemental relative weights/concentrations based on relative yields in the geological formation. The determined relative weights may be used to estimate formation properties, for example oil reservoir volume, to a higher accuracy and precision.

The specific embodiments described above have been shown by way of example, and it should be understood that these embodiments may be susceptible to various modifications and alternative forms. It should be further understood that the claims are not intended to be limited to the particular forms disclosed, but rather to cover modifications, equivalents, and alternatives falling within the spirit and scope of this disclosure.

The invention claimed is:

1. A system comprising:
   a pulsed neutron generator configured to emit neutrons into a borehole of a geological formation using a pulsing scheme;
   a gamma-ray detector configured to take measurements of capture gamma-rays during a time period during the pulsing scheme; and
   data processing circuitry configured to calculate one or more sigma values based at least in part on the measurements of capture gamma-rays taken during the time period during the pulsing scheme, to calculate a factor of yields to weights value based at least in part on the one or more sigma values, and to convert a plurality of relative yields of corresponding elements in the geological formation to a plurality of elemental relative weights based at least in part on the factor of yields to weights.

2. The system of claim 1, wherein the data processing circuitry is configured to estimate a property of the geological formation based at least in part on the plurality of elemental relative weights in the geological formation.

3. The system of claim 1, wherein the one or more sigma values are calculated via the data processing circuitry based at least in part on a decay rate of the measurements of capture gamma-rays.

4. The system of claim 1, wherein gamma-ray detector is configured to take measurements of the capture gamma-rays during the time period, wherein the time period is during an off period of the pulsing scheme.

5. The system of claim 4, wherein the time period occurs sufficiently after the pulsed neutron generator has turned off to cause the gamma-ray detector to detect substantially no photons due to inelastic scattering.

6. The system of claim 4, wherein the time period comprises the time from 10 micro seconds (µs) into the off period to 480 µs into the off period.

7. The system of claim 1, wherein the one or more sigma values comprises an apparent sigma, calculated via the data processing circuitry, that balances a borehole sigma and a formation sigma.

8. The system of claim 1, wherein the one or more sigma values comprises a plurality of sigma values, calculated via the data processing circuitry, which together balance borehole effects and formation effects.

9. The system of claim 1, wherein the borehole of the geological formation is cased.

10. The system of claim 1, wherein the factor of yields to weights value, calculated via the data processing circuitry, does not ignore hydrogen or chlorine in the borehole or the geological formation.

11. A method for determining a factor of yields to weights value in a borehole of a geological formation comprising:
    emitting neutrons, from a neutron generator, placed into the borehole in the geological formation, to cause capture and inelastic scattering events that generate photons;
    detecting the photons using one or more detectors;
    determining, via a processor, from the detected photons, at least one of:
       a ratio of photon counts between two detectors; or
       an apparent sigma;
    determining, via the processor, the factor of yields to weights value based at least in part on the at least one of:
       the ratio of photon counts between two detectors; or
       the apparent sigma;

converting, via the processor, a plurality of relative yields of elements in the geological formation to a plurality of elemental concentrations using the factor of yields to weights value; and determining, via the processor, a property of the geological formation using at least one of the plurality of elemental concentrations.

12. The method of claim 11, wherein the photons are detected during a time period defined by timing gates, during a pulsing scheme of the neutron generator, operatively controlled by the processor.

13. The method of claim 11, wherein determining the factor of yields to weights value takes into account elements in porous space.

14. The method of claim 13, wherein the elements in porous space include at least hydrogen and chlorine.

15. A method comprising:

emitting neutrons, out of a downhole tool placed into a borehole in a geological formation, to cause inelastic scattering events that generate photons;

detecting the photons using a plurality of detectors;

determining, via a processor, a count rate ratio of the photons between at least two of the plurality of detectors;

determining, via the processor, a factor of yields to weights value based at least in part on the count rate ratio;

converting, via the processor, a plurality of relative yields of corresponding elements in the geological formation to a plurality of elemental relative weights using the factor of yields to weights value; and determining, via the processor, a property of the geological formation using at least one of the plurality of elemental relative weights.

16. The method of claim 15, wherein the neutrons are emitted via a pulsed neutron generator.

17. The method of claim 16, wherein the photons are detected while the pulsed neutron generator is on.

18. The method of claim 15, wherein a first detector of the at least two of the plurality of detectors is positioned closer to a neutron source emitting the neutrons than a second of the at least two of the plurality of detectors.

19. The method of claim 15, wherein determining the factor of yields to weights value comprises using the count rate ratio and at least one of the plurality of relative yields of corresponding elements.

20. The method of claim 19, wherein the at least one of the plurality of relative yields of corresponding elements comprises an inelastic iron relative yield.

* * * * *